(12) United States Patent
Rabec

(10) Patent No.: US 10,343,850 B2
(45) Date of Patent: Jul. 9, 2019

(54) SYSTEM FOR DISTRIBUTING OBJECTS

(71) Applicant: C.E.R.M.E.X. Constructions Etudes et Recherches de Materiels pour l'Emballage d'Expedition, Corcelles les Citeaux (FR)

(72) Inventor: Dominique Rabec, Corcelles les Citeaux (FR)

(73) Assignee: C.E.R.M.E.X. CONSTRUCTIONS ETUDES ET RECHERCHES DE MATERIELS POUR L'EMBALLAGE D'EXPEDITION, Corcelles les Citeaux (FR)

( * ) Notice: Subject to any disclaimer, the term of this patent is extended or adjusted under 35 U.S.C. 154(b) by 0 days.

(21) Appl. No.: 15/720,263

(22) Filed: Sep. 29, 2017

(65) Prior Publication Data
US 2018/0093836 A1 Apr. 5, 2018

(30) Foreign Application Priority Data

Sep. 30, 2016 (FR) ..................................... 16 59416

(51) Int. Cl.
*B65G 47/64* (2006.01)
*B65G 47/52* (2006.01)
(Continued)

(52) U.S. Cl.
CPC ............ *B65G 47/52* (2013.01); *B65G 47/04* (2013.01); *B65G 47/082* (2013.01); *B65G 47/26* (2013.01);
(Continued)

(58) Field of Classification Search
CPC ... B65G 47/642; B65G 47/082; B65G 47/715
(Continued)

(56) References Cited

U.S. PATENT DOCUMENTS 4,003,465 A * 1/1977 Bauer .................... B65G 47/71
198/442
4,352,616 A * 10/1982 Brenner ................. B65G 57/22
198/374
(Continued)

FOREIGN PATENT DOCUMENTS

DE 233788 C 4/1911
FR 1 501 928 A 11/1967
(Continued)

OTHER PUBLICATIONS

French Search Report issued in Application No. 1659416, dated Jun. 7, 2017.

*Primary Examiner* — Joseph A Dillon, Jr.
(74) *Attorney, Agent, or Firm* — Young & Thompson

(57) ABSTRACT

Disclosed is a system for distributing objects designed to be inserted between an upstream machine delivering an input flow of objects in single-row form and a downstream machine requiring an output flow of objects in a controlled multiple-row form, including a conveyor belt that is configured to support and drive the objects in the direction of the flow, a deflector configured to deflect the input flow toward one of the rows of the output flow, and a unit for creating streams, configured to separate the input flow into streams of a predetermined quantity of objects, the unit for creating streams being placed immediately upstream from the rows of the output flow. Also disclosed is a method for distributing objects using such a system.

6 Claims, 2 Drawing Sheets

(51) Int. Cl.
  *B65G 47/04* (2006.01)
  *B65G 47/26* (2006.01)
  *B65G 47/08* (2006.01)
  *B65G 47/71* (2006.01)
  *B65G 47/68* (2006.01)
  *B65G 47/84* (2006.01)

(52) U.S. Cl.
  CPC .......... *B65G 47/715* (2013.01); *B65G 47/642* (2013.01); *B65G 47/648* (2013.01); *B65G 47/841* (2013.01); *B65G 2047/685* (2013.01)

(58) Field of Classification Search
  USPC ...... 198/367.1, 890, 418.7, 419.1, 431, 433, 198/440, 442, 445, 448
  See application file for complete search history.

(56) References Cited

U.S. PATENT DOCUMENTS

| | | | | |
|---|---|---|---|---|
| 6,126,383 | A * | 10/2000 | Franklin | B65G 47/086 198/374 |
| 7,000,755 | B2 * | 2/2006 | van Pinxteren | B65G 47/086 198/374 |
| 8,584,828 | B2 * | 11/2013 | Pundsack | B65G 17/26 198/426 |
| 8,939,273 | B2 * | 1/2015 | Thompson | B65G 47/46 198/367.1 |
| 2004/0129530 | A1 * | 7/2004 | Prakken | B65G 47/715 198/367 |
| 2008/0264759 | A1 | 10/2008 | Mignano | |
| 2010/0000841 | A1 * | 1/2010 | Fleischmann | B65G 47/715 198/462.3 |
| 2013/0105278 | A1 * | 5/2013 | Buchenberg | B65G 43/08 198/445 |
| 2014/0048384 | A1 * | 2/2014 | Borghi | B65G 47/642 198/367 |
| 2015/0060234 | A1 * | 3/2015 | Kurachi | B65G 21/10 198/370.03 |
| 2016/0046452 | A1 * | 2/2016 | Parker | B65G 47/71 198/442 |
| 2016/0159583 | A1 * | 6/2016 | Keil | B65G 47/71 198/442 |
| 2016/0219891 | A1 * | 8/2016 | Willburger | A22C 11/008 |
| 2017/0217691 | A1 * | 8/2017 | Hammacher | B65G 47/31 |

FOREIGN PATENT DOCUMENTS

| | | |
|---|---|---|
| FR | 2 228 326 A1 | 8/1975 |
| FR | 2 988 709 A1 | 10/2013 |
| GB | 1 487 475 A | 9/1977 |
| JP | S62-79723 U | 5/1987 |
| JP | H10-77114 A | 3/1998 |
| WO | 2012/028970 A1 | 3/2012 |

* cited by examiner

SYSTEM FOR DISTRIBUTING OBJECTS

This invention relates to the field of conveying objects within an industrial handling line. It relates more particularly to a system for distributing objects that can distribute a flow of upstream objects onto several downstream channels.

Solutions exist that make it possible to deflect articles from a single channel to a number of channels.

The document US20080264759 proposes a device that makes it possible to guide products coming from a single channel to a given channel. A movable section is used in order to direct the products toward the desired output. This device, in addition, comprises a separation means, making it possible to create a space between different streams of products.

However, these solutions do not ensure a satisfactory steadying of the objects during the channel-changing phases. They therefore cannot be used at high speeds because of too high a risk of objects falling and/or of jamming. Also, since the reliability of these devices is not ideal, the quantity of objects leaving the deflector cannot be controlled in a precise manner and detectors are necessary at the output from the deflector in order to correct possible errors.

This invention has as its object to eliminate these drawbacks at least partially. For this purpose, it proposes a system for distributing objects that is designed to be inserted between an upstream machine delivering an input flow of objects in single-row form and a downstream machine requiring an output flow of objects in a controlled multiple-row form, comprising a conveyor belt that is configured to support and drive the objects in the direction of the flow, a deflector configured to deflect the input flow toward one of the rows of the output flow, and a means for creating streams, configured to separate the input flow into streams of a predetermined quantity of objects, characterized in that said means for creating streams is placed immediately upstream from the rows of the output flow.

As a result of these arrangements, the distribution of the objects into the output rows is very precise. The quantity of product delivered into each row of the output flow is known precisely. It is then possible to go from a buffer accumulation area between the deflector and the downstream machine for wrapping or packing, and no means for error detection is necessary between the distribution system and the downstream machine. In addition, the operation can be adjusted with precision. The speed of the distribution system can therefore be regulated directly depending on the needs of the downstream machine. The idea of immediately upstream must be understood as near enough that it becomes almost impossible for objects to be separated from their stream of objects between the means for creating streams and the rows of the output flow. Typically, the downstream end of the means for creating streams is located at most two objects from the input of a row of the output flow.

According to other characteristics:
said means for creating streams can comprise two pins and a means for driving said pins in the direction of the flow from the side of the flow with a return from the side opposite the flow, each of said pins being designed, when it is moved in the direction of the flow, to separate the objects located downstream from those located upstream from said pin, which ensures a steadying of the objects during the sorting that is enough to enable the means for creating streams to operate at high speed without increasing the risks of objects falling and of jamming, said means for creating streams can comprise an input guide configured to keep the input flow out of the reach of said pin on a first portion of the length of the means for creating streams, and to engage the objects that are engaged with said pin on a second portion of the length of said means for creating streams; thus, the pins engage with the objects while they are perpendicular to the flow of objects, which facilitates the insertion of the pins between the objects, said means for creating streams can be mobile in translation in the direction that is crosswise to the direction of the flow, in order to be able to supply with objects successively various rows of the output flow, and said deflector is placed upstream from said means for creating streams, in order to deflect said input flow toward the input of the means for creating streams, which constitutes a simple and strong embodiment, said means for creating streams can be mobile in rotation around an axis located near the input of the means for creating streams and near the input row, in order to receive the input flow at a fixed point, and in order to position its output successively in front of the various rows of the output flow, the means for creating streams itself constituting the deflector, which makes the distribution system simpler, less bulky, and which reduces the risks of objects falling, of jamming and of distribution error all caused by the interface between the deflector and the means for creating streams; this also makes possible a simpler control.

This invention also relates to a method of distributing objects delivered in an input flow of objects in single-row form into an output flow of objects in a controlled multiple-row form, by means of a system according to the invention, characterized in that it comprises the following steps:
driving of the objects in the direction of the flow,
input of said objects into the deflector and the means for creating streams,
forming a stream, and separation from said stream of the upstream and downstream objects of said stream,
movement of the downstream end of the means for creating streams toward another row of the output flow,
introduction of said stream into said other row.

As a result of these arrangements, the objects are distributed into the output rows in a very precise manner. The speed of the distribution system can therefore be adjusted directly according to the needs of the downstream machine, and no means of error detection is necessary between the distribution system and the downstream machine.

According to other characteristics:
the method can comprise the following steps after the input into the means for creating streams:
accumulation of the upstream objects against a first pin, to separate them from the objects that are downstream from said first pin until the engagement between the following pin and the objects of the input flow is achieved,
accumulation of the upstream objects against the following pin, to separate them from the objects located between said following pin and said first pin,
speeding up, by retraction of the first pin, of the objects that were located between the first pin and the following pin, forming a stream that engages in one of the rows of the output flow.

In this way, the objects are well steadied during their sorting, which makes the sorting precise and prevents the objects from falling, even if the means for creating streams operates at high speed.

Before said braking of the upstream objects from said first pin, the method can comprise the following steps:
keeping out of the reach of said pins at the input of the means for creating streams,
guiding of the objects toward said first pin until the engagement between said first pin and the objects is achieved.
In this way, the pins engage with the objects while they are perpendicular to the flow of objects, which facilitates the insertion of the pins between the objects.

This invention will be better understood on reading the following detailed description, with reference to the accompanying figures in which.

Figure 1:
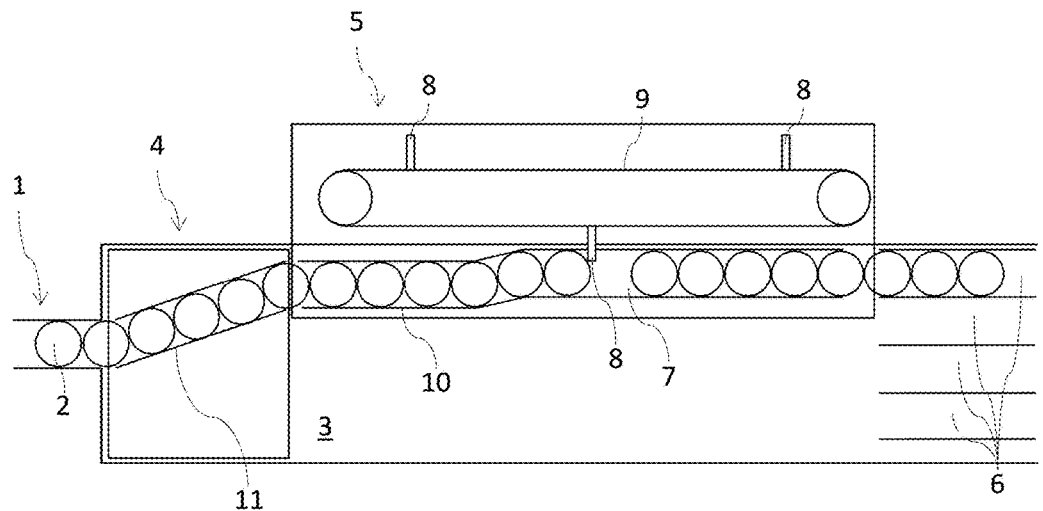
FIG. 1 is a top view of a distribution system according to the invention in a first embodiment, in a first position.

The system for distributing objects according to the invention, shown in FIGS. 1 to 4, is placed between an upstream machine and a downstream machine. The upstream machine supplies the distribution system with an input line 1 conveying a flow of objects 2 in single-row form. The distribution system comprises a conveyor belt 3, a deflector 4 and a means for creating streams 5, which can all be mounted on a common frame. The means for creating streams 5, also called sorter 5 in the description below, contributes to creating spaces in the single-row column of objects 2, to transform a compact column into successive separated streams. The sorter 5 can comprise longitudinally mobile stops, against which the compact column of objects 2 comes to rest. The differences in speed between the conveyor belt 3 and said stops or pins make it possible to create said spaces. At the output of the distribution system, the objects 2 are distributed into different rows of the output flow, for example formed by the output channels 6, the downstream machine needing to be supplied with a controlled multiplicity of rows that are generally separated from one another by walls.

The objects 2 can be, for example, plastic bottles, and the upstream machine can be a bottle labeler. The downstream machine can be a wrapping machine. This type of machine produces blocks by wrapping a certain number of objects 2, for example in a plastic film. For example, if it is desired to make packs of six bottles, three long and two wide, the wrapping machine requires a three-channel input, and it will handle the bottles two by two in each channel. The wrapping machine knows to introduce the film between two successive objects in an input chute, but it is necessary that in all of the parallel rows under consideration the objects be aligned with one another. In the example above, the wrapping machine takes two objects from each chute; the first object from the first chute must be aligned in a line that is perpendicular to the chutes with the first object of the other two chutes. The wrapping machine can produce blocks of different sizes, depending on the adjustments made on the machine, provided that they are rectangular in shape. It is also possible to conceive that the wrapping machine makes several blocks at the same time, for example two 2×2 blocks at the same time.

In the preferred embodiment of the invention shown in FIGS. 1 to 4, the sorter 5 comprises a longitudinal chute 7, pins 8 and a drive means 9 such as a belt or a chain, parallel to the chute 7. The pins 8 are attached to the drive means and are moved parallel to the objects 2 in the direction of the flow of the objects 2, and then make a return before resuming their course parallel to the objects 2.

For example, the pins 8 can be placed on a chain 9 that winds around a drive sprocket gear and around a return sprocket gear.

When a pin 8 is moved in the direction of the flow of the objects 2, it is inserted into the flow and separates the objects 2 that are upstream from the pin 8 from the objects 2 that are downstream from the pin 8. The column of objects 2 is compact from the upstream portion of the distribution system and up to a first pin 8. Since the speed of the drive means 9 is less than the speed of the conveyor belt 3, the first pin 8 therefore limits the speed of the compact column of objects 2 to a value that is less than that of the conveyor belt 3. When it arrives at the end of its course that is parallel to the objects 2 and just before making its return, the first pin 8 is retracted, which pin then has the effect of freeing the objects 2 up to the next upstream pin 8 and of making it possible for the conveyor belt 3 to speed them up. Thus, a space is created between the objects 2 that extend in the upstream direction from the following pin 8, and the downstream objects 2, which have just been freed by the first pin 8. The space between all of the pins 8 is identical, so that the streams are composed of a fixed number of objects 2. In a preferred embodiment of the invention shown in FIGS. 1 to 4, the sorter 5 comprises three pins 8. The presence of three pins 8 makes it possible to ensure that when a pin 8 is inserted into the flow of objects 2, another pin 8 is then engaged with the objects 2 downstream from the chute 7. Thus, the streams are formed by a compact column of objects 2, and it is ensured that each stream coming out of the sorter 5 is made up of the same number of objects 2, the size of the streams corresponding to the spacing between two pins 8.

The chute 7 of the sorter 5 can comprise an input guide 10, placed parallel to the drive means 9, which keeps the flow of objects 2 out of the reach of the pins 8 in a first portion of the chute 7. In this embodiment, it is only downstream from the input guide 10 that the objects 2 are brought close to the pins 8 that are then able to be inserted between the objects 2. In this way, the pins 8 engage with the objects 2 while they are perpendicular to the flow of objects 2, which facilitates the insertion of the pins 8 between the objects 2.

Actually, if such an input guide 10 is not provided, the objects 2 are then within reach of the pin 8 at the point when it returns to the flow side; at that moment, it makes a rotational movement at the same time as a translational movement, and its linear speed at the end of the pin 8 can be too great.

It is possible, for example, to provide that the input guide 10 keeps the objects 2 out of the reach of the pin 8 over a length of two objects 2, and then pushes the objects 2 toward the pin 8.

Figure 2:
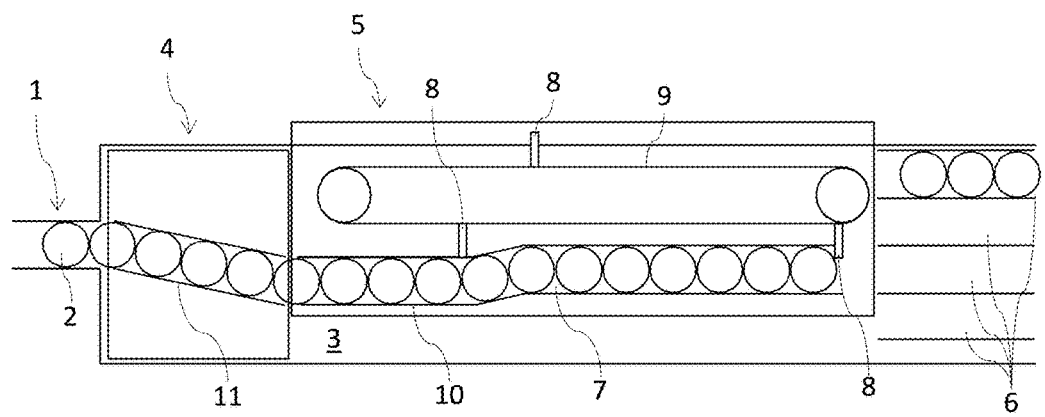
FIG. 2 is a top view of a distribution system according to the invention in a first embodiment, in a second position.

In a first embodiment shown in FIGS. 1 and 2, the deflector 4 located upstream from the sorter 5 comprises a deflector guide 11 composed of, for example, two parallel walls. The deflector guide 11 is configured to receive the objects 2 at the input of the distribution system, and then to direct them approximately opposite the output channel 6 to which the objects 2 are destined. In this embodiment, the sorter 5 is mobile in translation in a direction that is crosswise to the flow of objects 2, in order to be aligned with the upstream deflector guide 11 and successively with the different output channels 6 to which the downstream objects 2 are destined.

To change the output channel 6, the sorter 5 is moved from its initial position to a position where its chute 7 is well aligned with the output channel 6 that is selected to receive the objects 2. When a stream of objects 2 has just been entirely transferred to an output channel 6, the sorter 5 makes a translational movement in a direction that is crosswise to the flow of the objects 2. More specifically, once the object 2 that is the most upstream from the preceding stream is sufficiently engaged in the output channel 6, the sorter 5 is moved so that its downstream mouth arrives opposite the following output channel 6, so that the objects 2 of the following stream all enter there. The space between two streams, created by the pins 8, corresponds at a minimum to the time necessary for the sorter 5 to be positioned opposite the output channel 6 toward which the next stream must be directed. Thus, in FIG. 2, the sorter 5 has just positioned itself opposite an output channel 6 and is about to transfer the next stream there.

When the sorter 5 makes a translational movement, the deflector guide 11 makes a rotational movement so that the output of the deflector guide 11 is always positioned opposite the input of the chute 7. Actually, the flow of objects 2 coming from the input line 1 is continuous and in the case of non-alignment of the output of the deflector guide 11 and of the input of the chute 7, there is a risk of objects 2 falling and of input of objects 2 that are not sorted into the output channels 6.

Figure 3:
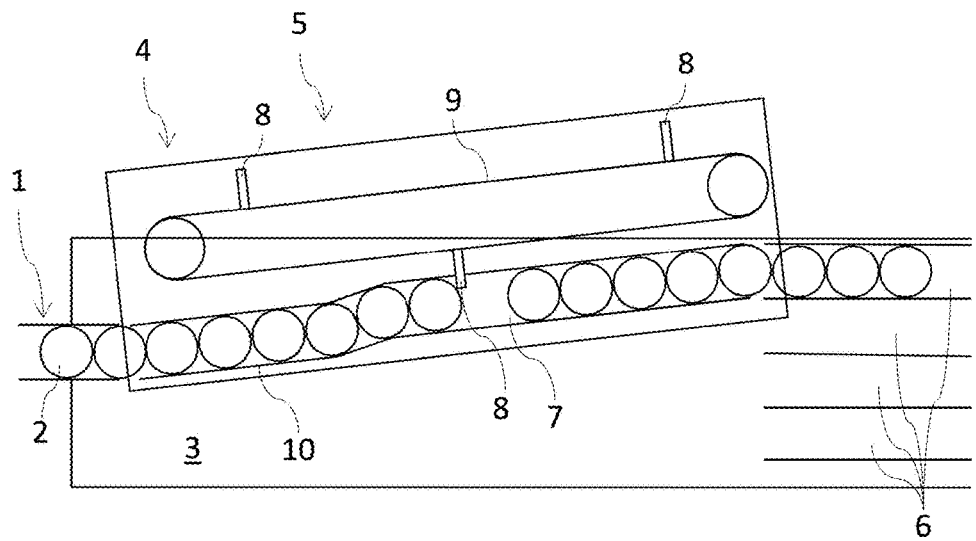
FIG. 3 is a top view of a distribution system according to the invention in a second embodiment, in a first position.
Figure 4:
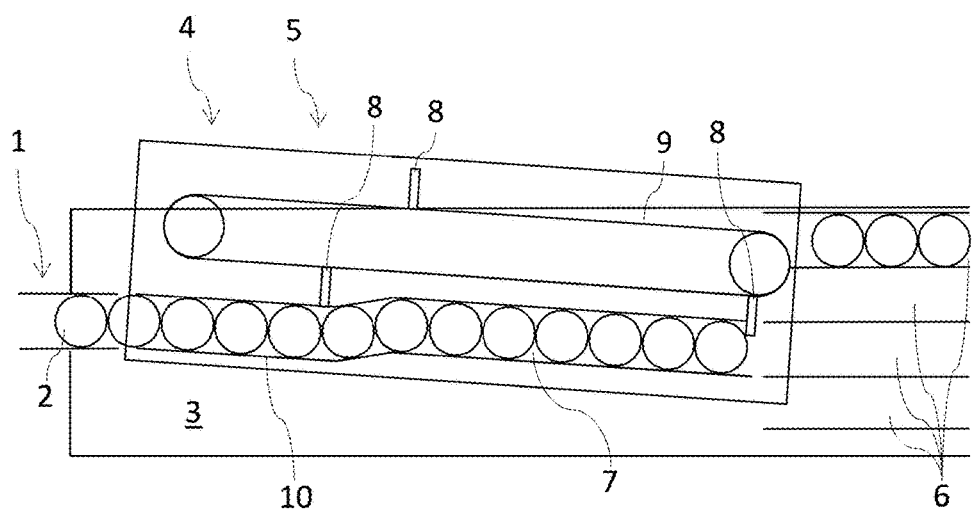
FIG. 4 is a top view of a distribution system according to the invention in a second embodiment, in a second position.

In a second embodiment shown in FIGS. 3 and 4, the sorter 5 is mobile in rotation around an axis located near the input of the sorter 5 and the input line 1, in order to be able to be aligned directly with the upstream input line 1 and the output channel 6 to which the downstream objects 2 are destined. In this way, the sorter 5 itself constitutes the deflector 4, which simplifies the distribution system and saves space.

To change output channel 6, the sorter 5 is moved from its initial position to a position where its chute 7 is well aligned with the output channel 6 selected to receive the objects 2. When a stream of objects 2 has just been entirely transferred to an output channel 6, the sorter 5 makes a rotational movement around an axis located near the input of the sorter 5 and the input line 1. More specifically, once the object 2 that is the most upstream from the preceding stream is sufficiently engaged in the output channel 6, the sorter 5 is moved so that its downstream mouth arrives opposite the following output channel 6, so that the objects 2 of the following stream all enter there. The space between two streams, created by the pins 8, corresponds at a minimum to the time necessary for the sorter 5 to be positioned opposite the output channel 6 toward which the next stream must be directed. Thus, in FIG. 2, the sorter 5 has just been positioned opposite an output channel 6 and is about to transfer the next stream there.

In the second embodiment, since the sorter 5 is fulfilling the functions of the deflector 5, the risks of objects 2 falling or of arrival in the output channels 6 of non-sorted objects 2, associated with a poor alignment of the deflector 4 and of the sorter 5, are further reduced.

The speed of the distribution system can be adjusted directly depending on the needs of the downstream machine. Actually, since the sorting is done immediately upstream from the downstream machine, it ensures that the changing of the output channel 6 is done precisely during the gap made during the separation from one stream to another. Further, the number of objects 2 freed from each output channel 6 is known precisely, which avoids the use of a downstream accumulation zone, and which makes it possible to coordinate the operations. If the sorter 5 is placed upstream from the deflector 4, the objects 2 can move relative to one another within the deflector 4, and it happens that an object 2 finds itself in the output channel that precedes or follows the one where it should be found. This results in a poor control of the quantities present in each output channel. It is then necessary to monitor the variation in these quantities, to place sensors that warn when the quantities deviate too much from the quantity anticipated, either more (maxi) or less (mini), hence their sensor name mini-maxi, and to provide specific procedures for remedy. This appreciably complicates the programming of the distribution device, and necessitates providing excessive lengths of output channels, and therefore an increase in the length necessary for set-up.

Further, the size of each stream is very precisely respected as a result of their being held upstream and downstream by the pins 8 as they pass through the chute 7, and the quantity of objects 2 delivered into each output channel 6 depends precisely on the speed of the distribution system. It is thus possible to eliminate the mini-maxi sensors, as well as the remedy procedures, and to gain set-up space for the machines, and consequently to reduce investment costs.

The fact of completely controlling the quantity of objects delivered into each output channel 6 has many advantages. In addition to those already cited, it makes it possible to control the upstream machine directly in a coordinated way with the downstream machine. If more objects 2 are needed in the area of the downstream machine, it is enough to increase the speed of the upstream machine (in accordance with its own possibilities, of course), and to adjust the speed of the deflector 4 and of the sorter 5. There is no need to deal with undesirable effects because the deflector/sorter does its work completely.

The distribution system according to the invention can, for example, be used according to the following method for the purpose of creating, from an input flow of objects 2 coming from an input line 1 comprising a single row, an output flow of objects 2 distributed in a multiplicity of output channels 6:

driving of the objects 2 in the direction of the flow by the conveyor belt 3,
 inputting of the objects 2 into the deflector 4 and the sorter 5,
 forming a stream, and separation from the stream of the objects 2 that are found upstream and downstream from the stream,
 movement of the downstream end of the sorter 5 to another output channel 6 of the output flow,
 introduction of the stream into the output channel 6 of the output flow toward which the downstream end of the sorter 5 has moved.

In a preferred embodiment, the above method is completed by the following steps after the input of the objects 2 into the sorter 5:

accumulation of the upstream objects 2 against a first pin 8 for the purpose of separating them from the objects 2 that are downstream from the first pin 8 until the engagement between the following pin 8 and the objects 2 of the input flow is achieved,
 accumulation of the upstream objects 2 against the following pin 8 for the purpose of separating them from the objects 2 located between the following pin 8 and the first pin 8, speeding up, by retraction of the first pin 8, of the objects 2 that were located between the first pin 8 and the following pin 8, forming a stream that engages in one of the output channels 6.

In a particular embodiment, the method is further completed by the following steps before the accumulation of the upstream objects 2 against the first pin 8:

keeping out of the reach of the pins 8 at the input of the sorter 5, guiding toward the first pin 8 objects 2 until the engagement between the first pin 8 and the objects 2 is achieved.

As indicated above, the means for creating streams 5 is designed to separate the single-row input flow of objects 2 into streams of a predetermined quantity of objects 2. Each stream is therefore a group of multiple objects 2 arranged behind one another. A stream is a column of a predetermined number of objects 2, which extends in the direction of the flow. Two successive objects of the same stream are preferably in contact with one another. The means for creating streams 5 creates spaces within a row of objects, with these spaces separating one stream from another stream.

In a general manner, the deflector 4 and the means for creating streams 5 are mobile within the object distribution system.

In a first embodiment illustrated in FIGS. 1 and 2, the deflector 4 is mobile in rotation in relation to the input line 1, and the means for creating streams 5 is mobile in translation in relation to the input row 1. Using these combined movements of rotation and translation, the streams are directed toward the output lines 6.

In a second embodiment illustrated in FIGS. 3 and 4, the deflector 4 and the means for creating streams 5 form a single object distribution system. This distribution system is mobile in rotation in relation to the input row 1 for directing the streams toward the output lines 6.

As indicated above, according to a preferred embodiment, the sorter 5 comprises a longitudinal chute 7, pins 8, and a drive means 9 that is parallel to the chute 7. Such a drive means 9 can be in particular at least an endless belt 9 that is wound around two drums. Thus, the means for creating streams 5 can comprise a longitudinal chute 7 and at least two pins 8 that are attached to at least one endless belt 9 that is wound around two drums. The at least one endless belt 9 extends parallel to the longitudinal chute 7, and the two drums are located behind one another in the direction of the flow. The means for creating streams 5 is arranged in such a way that the pins 8 are able to come into contact with the objects 2 at least over a portion of their path in the direction of the flow. The pins 8 are spaced in such a way that they can each be meshed with separate objects 2.

The endless belt can be, for example, represented by a chain or a belt, and the drums can preferably be pulleys or sprocket gears, whose axes are transverse in relation to the direction of the flow. One of the upstream or downstream drums is provided to be driven in rotation by means of, for example, a servomotor, in such a way as to drive the endless belt and therefore the pins 8 around the drums, and in such a way that the endless belt 9 moves in the same direction as the conveyor belt 3.

Each pin 8 has overall the form of a plate placed perpendicularly to the endless belt. It constitutes an obstacle to the passage of objects 2 for the formation of a stream.

Thus, the means for creating streams 5 can be configured in such a way that when a pin 8 is inserted into the flow of objects 2, another pin 8 is also meshed with the objects 2 downstream from the chute 7. Thus, the streams are formed by a compact column of objects 2, and it is ensured that each stream coming out of the sorter 5 is made up of the same number of objects 2, the size of the streams corresponding to the spacing between two pins 8. To do this, the speed of the endless belt 9 can be adjusted. It can also be adjusted based on the desired flow in the machine downstream from the distribution system.

Such an embodiment advantageously makes it possible to eliminate any detection means designed to record the number of passing objects in order to create streams, since they are created automatically during travel from the at least one endless belt 9 and thus pins 8.

According to a first variant of this embodiment presented in detail above, the means for creating streams 5 comprises a single endless belt 9. According to this variant, at least three pins 8 are preferably attached to the endless belt 9 in such a way that when a pin 8 is inserted into the flow of objects 2, another pin 8 is also meshed with the objects 2 downstream from the chute 7, as described above. The pins 8 are uniformly spaced on the endless belt 9 in such a way that the streams consist of a fixed number of objects 2. The endless belt 9 in principle travels at a speed that is constant and slightly less than the travel speed of the conveyor belt 3.

According to a second variant, the means for creating the stream 5 comprises at least two endless belts 9 and on each of these endless belts 9 is attached at least one pin 8. Preferably, the means for creating the stream 5 is formed by two pins 8, one being attached to a first endless belt 9, the other to a second endless belt 9.

In this case, the first endless belt and the second endless belt are arranged side by side and wound around separate drums. Thus, the two endless belts 9 are driven separately in order to be able to travel independently of one another.

In order to save space, the engine drum preferably constitutes the upstream drum of one of the belts 9 and the downstream drum of the other belt 9 in the direction of flow. The result is that the attached drum preferably constitutes the upstream drum of one of the belts 9 and the downstream drum of the other belt 9 in the direction of the flow. The axes of the drums of the first endless belt and the second endless belt are preferably combined.

Advantageously, according to this second variant with two endless belts 9, the speed of the pins 8 is not constant. It is adjusted to form streams of objects 2 of constant length. The speed of the endless belts 9 is then programmed so that:

when the pin 8 of a belt 9 is inserted into the flow of objects 2, the pin 8 of the other belt 9 is also meshed with the objects 2 downstream from the chute 7, and the distance between the two consecutive pins 8 meshed with objects 2 is at a constant distance corresponding to the length of the streams formed.

In other words, when a pin 8 is inserted into the flow of objects 2, it circulates at a constant speed V1, preferably less than the speed of the conveyor belt 3, to ensure that the objects 2 upstream from the pin 8 form a compact row, i.e., without space between the objects 2. When it is retracted, it generally speeds up on its return trip in such a way as to be able to be at the desired distance from the pin 8 of the other belt 9 that travels at a speed V1 and is meshed with objects 2, when being inserted again into the flow. It then travels at a speed V1 until again being retracted.

Although the above description is based on particular embodiments, it is in no way limiting of the scope of the invention, and modifications can be made, particularly by substitution of technical equivalents or by a different combination of all or part of the characteristics developed above.

The invention claimed is:

1. System for distributing objects designed to be inserted between an upstream machine delivering an input flow of objects (2) in single-row form and a downstream machine requiring an output flow of objects (2) in a controlled multiple-row form, comprising a conveyor belt (3) that is configured to support and drive the objects (2) in the direction of the flow, a deflector (4) configured to deflect the input flow toward one of the rows of the output flow, and a means for creating streams (5), configured to separate the input flow into streams of a predetermined quantity of objects (2), wherein said means for creating streams (5) is placed immediately upstream from the rows of the output flow, wherein said means for creating streams (5) has at least two pins (8) and a means for driving said pins (8) in the direction of the flow from the side of the flow with a return from the side opposite to the flow, each of said pins (8) being designed, when it is moved in the direction of the flow, to separate the objects (2) located downstream from those located upstream from said pin (8).

2. Distribution system according to claim 1, in which said means for creating streams (5) comprises an input guide (10) configured to keep the input flow out of the reach of said pin (8) on a first portion of the length of the means for creating streams (5), and to engage the objects (2) that are engaged with said pin (8) on a second portion of the length of said means for creating streams (5).

3. Distribution system according to claim 1, in which said means for creating streams (5) is mobile in translation in the direction crosswise to the direction of the flow, in order to be able to supply with objects (2) successively various rows of the output flow, and said deflector (4) is placed upstream from said means for creating streams (5), in order to deflect said input flow toward the input of the means for creating streams (5).

4. Distribution system according to claim 1, in which said means for creating streams (5) is mobile in rotation around an axis located near the input of the means for creating streams (5) and the input row, in order to receive the input flow at a fixed point and to position its output successively in front of the various rows of the output flow, the means for creating streams (5) itself constituting the deflector (4).

5. Distribution system according to claim 2, in which said means for creating streams (5) is mobile in translation in the direction crosswise to the direction of the flow, in order to be able to supply with objects (2) successively various rows of the output flow, and said deflector (4) is placed upstream from said means for creating streams (5), in order to deflect said input flow toward the input of the means for creating streams (5).

6. Distribution system according to claim 2, in which said means for creating streams (5) is mobile in rotation around an axis located near the input of the means for creating streams (5) and the input row, in order to receive the input flow at a fixed point and to position its output successively in front of the various rows of the output flow, the means for creating streams (5) itself constituting the deflector (4).

* * * * *